US006680014B2

(12) United States Patent
Wu

(10) Patent No.: US 6,680,014 B2
(45) Date of Patent: Jan. 20, 2004

(54) METHOD FOR MAKING CANDLE OUT OF JELLY WAX

(76) Inventor: Chun-Yi Wu, 4F-6, No. 2-96, Sung Pu Pei Lane, Niao Sung Hsiang, Kaohsiung Hsien (TW)

( * ) Notice: Subject to any disclaimer, the term of this patent is extended or adjusted under 35 U.S.C. 154(b) by 316 days.

(21) Appl. No.: 09/885,058

(22) Filed: Jun. 21, 2001

(65) Prior Publication Data

US 2002/0195743 A1 Dec. 26, 2002

(51) Int. Cl.[7] ............................ C11C 5/00; B29C 39/20

(52) U.S. Cl. ...................... 264/73; 264/255; 264/279.1; 264/247; 431/125; 431/126; 431/291

(58) Field of Search ................................ 264/245, 246, 264/247, 250, 255, 259, 267, 268, 271.1, 279, 279.1, 73; D26/6; 431/125, 126, 288, 290, 291

(56) References Cited

U.S. PATENT DOCUMENTS

| | | | | | |
|---|---|---|---|---|---|
| 3,844,706 | A | * | 10/1974 | Tsaras | 431/288 |
| 3,894,136 | A | * | 7/1975 | Waddill | 264/245 |
| 3,947,232 | A | * | 3/1976 | Foster | 431/288 |
| 4,077,110 | A | * | 3/1978 | Reiher | 29/458 |
| 6,096,102 | A | * | 8/2000 | Matthai et al. | 431/288 |
| 6,129,771 | A | * | 10/2000 | Ficke et al. | 431/288 |
| 6,171,101 | B1 | * | 1/2001 | Freeman et al. | 431/291 |
| 6,296,477 | B1 | * | 10/2001 | Lin | 431/291 |
| RE37,672 | E | * | 4/2002 | Bell et al. | D26/6 |
| 6,543,913 | B2 | * | 4/2003 | Fedtchouk | 264/73 |
| 2002/0102507 | A1 | * | 8/2002 | Riches | 431/291 |
| 2002/0150854 | A1 | * | 10/2002 | Riches | 431/291 |
| 2002/0168600 | A1 | * | 11/2002 | McGee et al. | 431/291 |

* cited by examiner

*Primary Examiner*—Mark Eashoo
*Assistant Examiner*—Geoffrey P. Shipsides
(74) *Attorney, Agent, or Firm*—Rosenberg, Klein & Lee

(57) ABSTRACT

A method for making a candle out of jelly wax includes the following steps: disposing a wick and ornaments in a container; pouring heated liquid jelly wax into the container to form a first layer, and waiting 1 to 2 hours for the liquid wax to become solid; pouring heated liquid jelly wax into the container to form a second layer with air bubbles, and waiting 30 to 40 minutes for same to change to a semi-coagulate state before beginning next step; pouring liquid jelly wax heated to between 100° C. and 150° C. into the container to form a third layer. The jelly wax of the third layer will partially mix with the second layer in semi-coagulated state to form several layers of jelly wax with colors slightly changing one to the next.

4 Claims, 8 Drawing Sheets

(3 of 8 Drawing Sheet(s) Filed in Color)

METHOD FOR MAKING CANDLE OUT OF JELLY WAX

BACKGROUND OF THE INVENTION

The present invention relates to a method for making jelly wax candle, and particularly to one for making jelly wax candle having air bubbles in it and consisting of layers of different colors.

Candles can be made into various shapes instead of the conventional round stick shape so that they have ornamental function besides producing light. Furthermore, melted wax with dyes and aromatic oils added to can be poured into containers of various shapes to make a candle which is colorful, and can send forth pleasant smell when it is burned to produce light.

Referring to FIG. 4, a conventional method for making a candle out of wax includes the following steps:

(1) heating wax for same to become liquid, and adding aromatic oil or dyes to the liquid wax;

(2) disposing ornaments and a wick in a container;

(3) pouring the liquid wax into the container;

(4) cooling the wax for same to become solid.

If the ornaments are flowers, referring to FIG. 5, the method for making a candle out of wax may include the following steps:

(1) heating the wax;

(2) applying a layer of wax onto the flowers, and disposing the flowers and a wick in a container;

(3) pouring the liquid wax into the container;

(4) cooling.

However, the above candles made out of wax with ornamental function become less and less attractive over time due to change of consumers' standard on beauty. Actually, candles made by the above methods have monotonous look, such as are shown in FIGS. 9 and 10.

SUMMARY OF THE INVENTION

Therefore, it is a main object of the present invention to provide a method for making a candle out of jelly wax, which has relatively much variety as compared with those made by the conventional methods.

The method for making a candle out of jelly wax in the present invention includes steps as follows:

(1) drying the ornaments, and the container providing for holding the jelly wax;

(2) disposing a wick and the ornaments in the container;

(3) pouring liquid jelly wax heated to between 80° C. and 100° C. into the container to form a first layer, and waiting one to two hours for the jelly wax to change to solid state before the next step;

(4) pouring liquid jelly wax into the container to form a second layer; the jelly wax being heated to between 60° C. and 170° C. so that air bubbles can form in it when it is poured into the container, waiting thirty to forty minutes for the jelly wax of the second layer to change to semi-coagulated state before the next step;

(5) pouring liquid jelly wax heated to between 100° C. and 150° C. into the container for a third layer to form, the jelly wax for the third layer having oily dyes, and aromatic oils added to, the jelly wax partially mixing with the second layer in semi-coagulated state to form several layers of jelly wax having colors slightly changing from one to the next.

BRIEF DESCRIPTION OF THE DRAWINGS

The file of this patent contains at least one photograph executed in color. Copies of this patent with color drawings will be provided by the Patent and Trademark Office upon request and payment of the necessary fee.

This invention will be better understood by referring to the accompanying drawings, wherein.

DETAILED DESCRIPTION OF THE PREFERRED EMBODIMENTS

Figure 1:
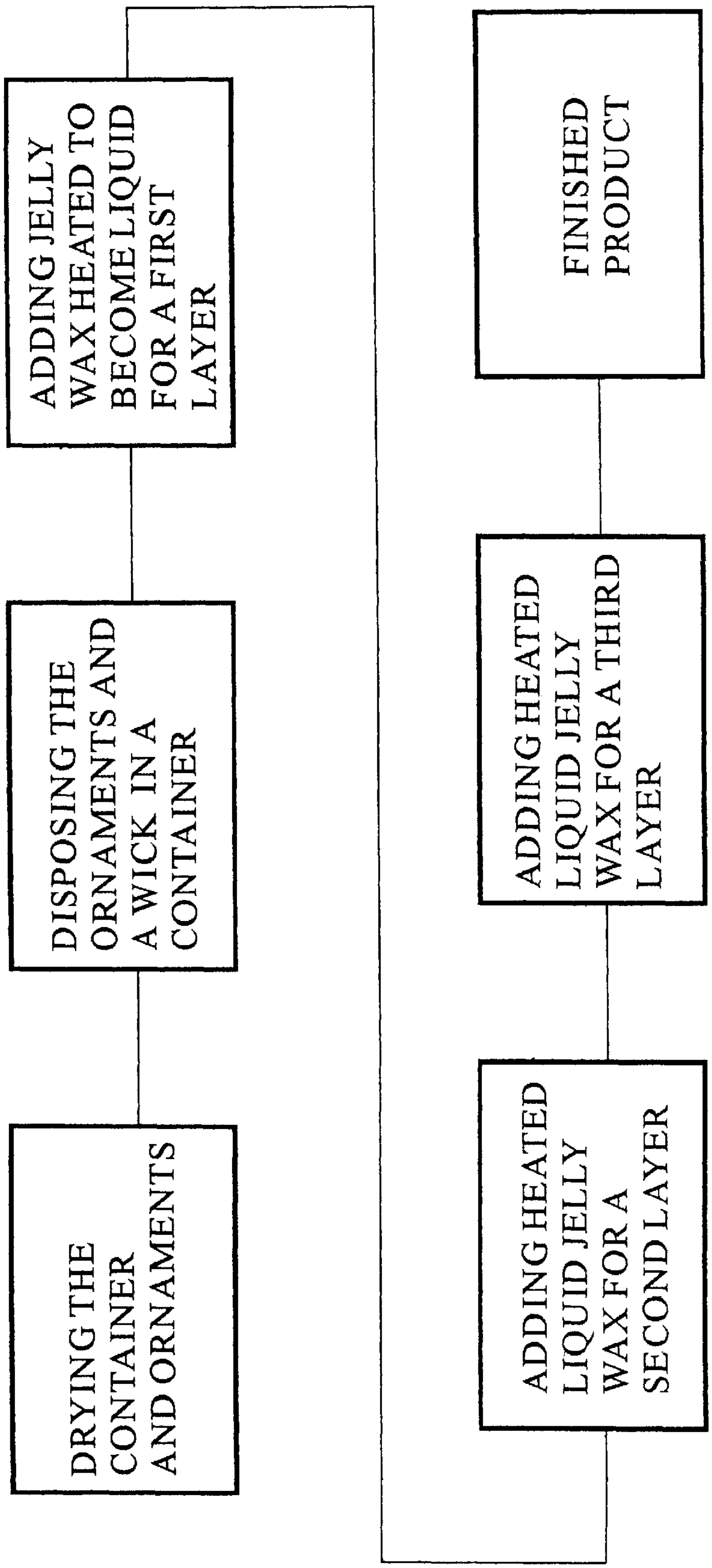
FIG. 1 is a flow chart of a method for making candle out of jelly wax according to the present invention.
Figure 2:
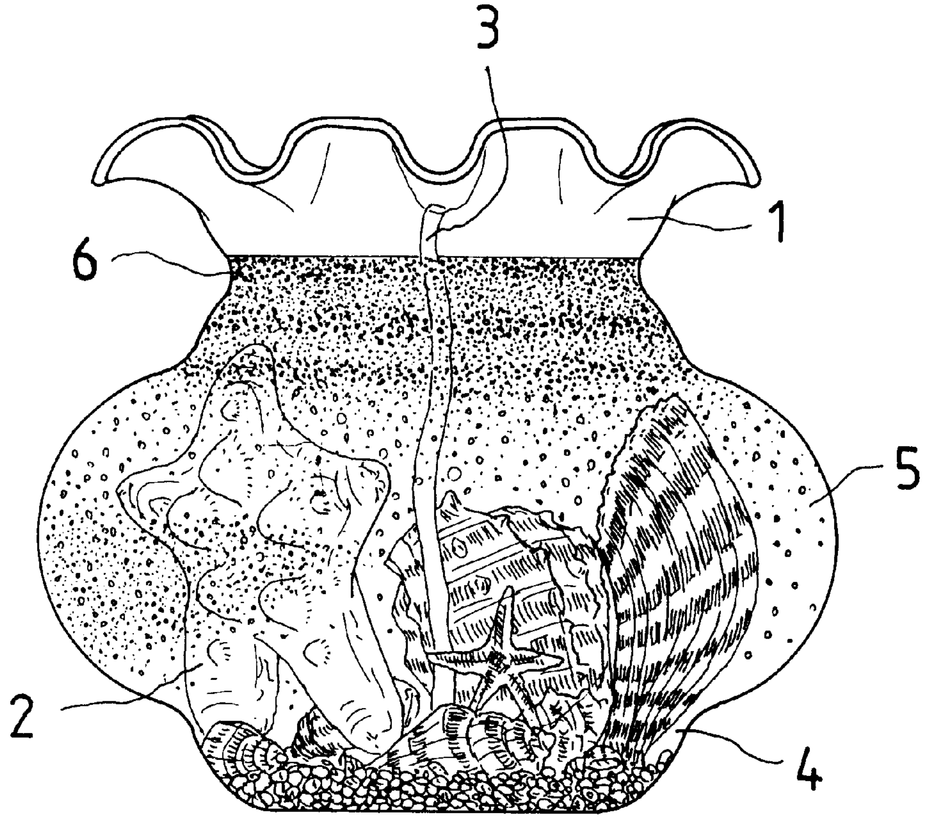
FIG. 2 is a front view of a candle made according to the method of the present invention.

Referring to FIGS. 1 and 2, a method for making a candle out of jelly wax in the present invention includes the following steps:

(1) drying the ornaments 2 and a container 1 with a drying apparatus; the ornaments 2 can be sand, shells, starfish and so on; the container 1 is preferably transparent or semi-transparent;

(2) disposing a wick 3 and the ornaments 2 in the container 1; if the ornaments include sand, the sand is put on the bottom of the container 1 first, and the wick 3 is fixed by means of the sand, and then the rest of the ornaments are disposed in the container 1;

(3) pouring liquid jelly wax into the container 1 for the first time; the jelly wax is heated to between 80° C. and 100° C., and stirred to become liquid form; then the liquid jelly wax is poured into the container 1 until it submerges the ornaments 2, and becomes a first layer of jelly wax 4; waiting one to two hours for the first layer of jelly wax to change to a solid state;

(4) pouring liquid jelly wax into the container for the second time; the jelly wax is heated to between 60° C. and 170° C. to become liquid, and then the liquid jelly wax is poured into the container 1 for a second layer of jelly wax 5 to form; waiting 30 to 40 minutes for the liquid jelly wax to change to a semi-coagulated state; because air will be mixed with the liquid jelly wax when the wax is poured into the container 1, air bubbles form in the second layer; the number of the air bubbles depends on the temperature of the liquid jelly wax, i.e. the higher the temperature is, the fewer the air bubbles are;

(5) pouring the liquid jelly wax into the container 1 for the third time; jelly wax is heated to between 100° C. and 150° C., and mixed with oily dyes and aromatic oil; then, the liquid wax is poured into the container 1 to become a third layer of jelly wax 6; because the second layer has not completely become solid, the liquid jelly wax with oily dyes, while forming the third layer, will partially mix with the second layer of jelly wax such that several layers of jelly wax with colors having slight differences are formed.

If petals or plants are used as ornaments, a layer of solid wax is applied onto them to make same stiff. Then, liquid jelly wax heated to between 70° C. and 100° C. is applied onto the solid wax of the ornaments several times such that the petals and the plants won't be damaged by the liquid jelly wax being poured into the container 1.

Figure 3:
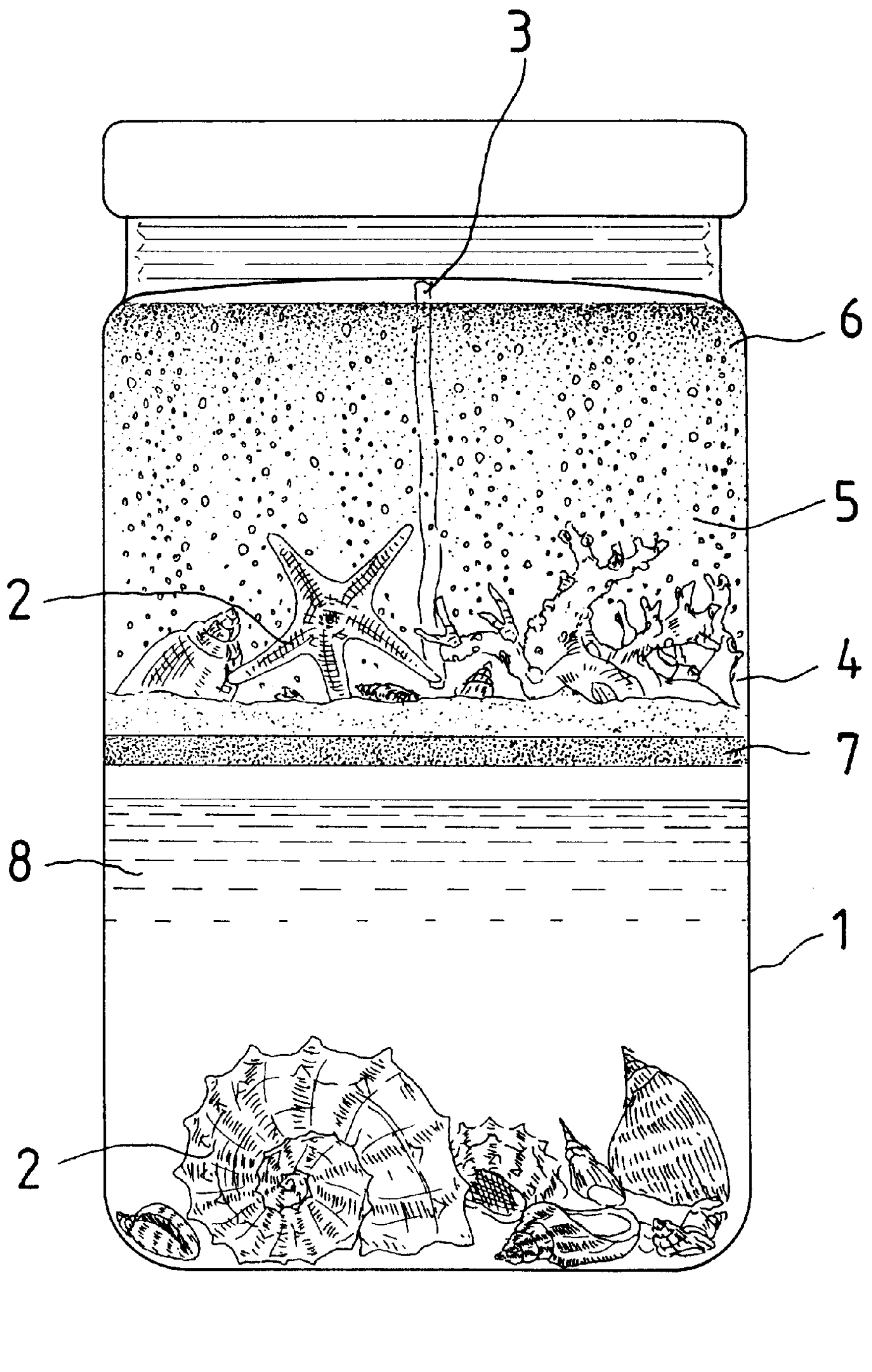
FIG. 3 is a front view of a candle made according to a second embodiment of the present invention.
Figure 4:
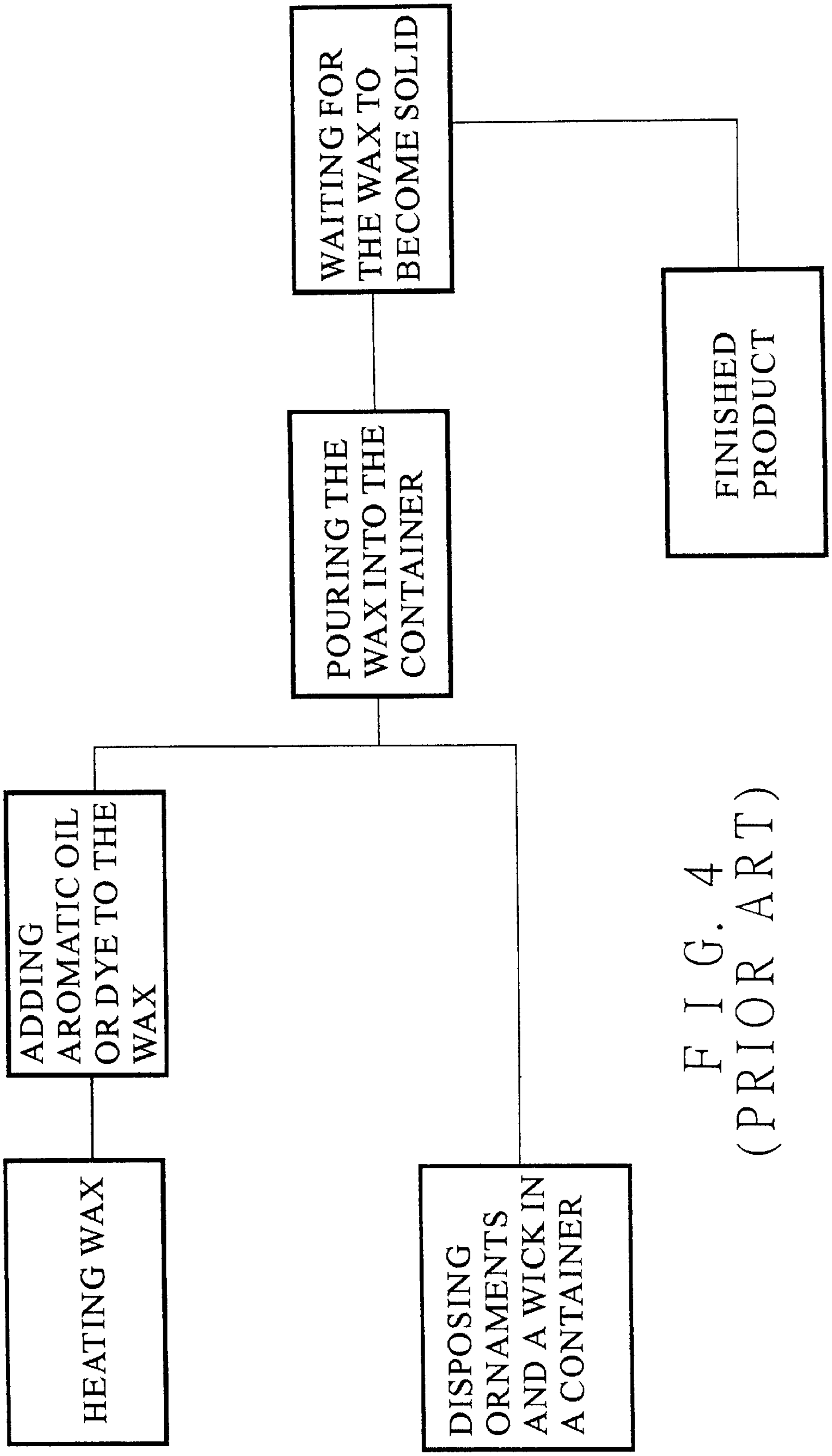
FIG. 4 (PRIOR ART)
FIG. 4 is a flow chart of a conventional method for making a candle in the Background.
Figure 5:
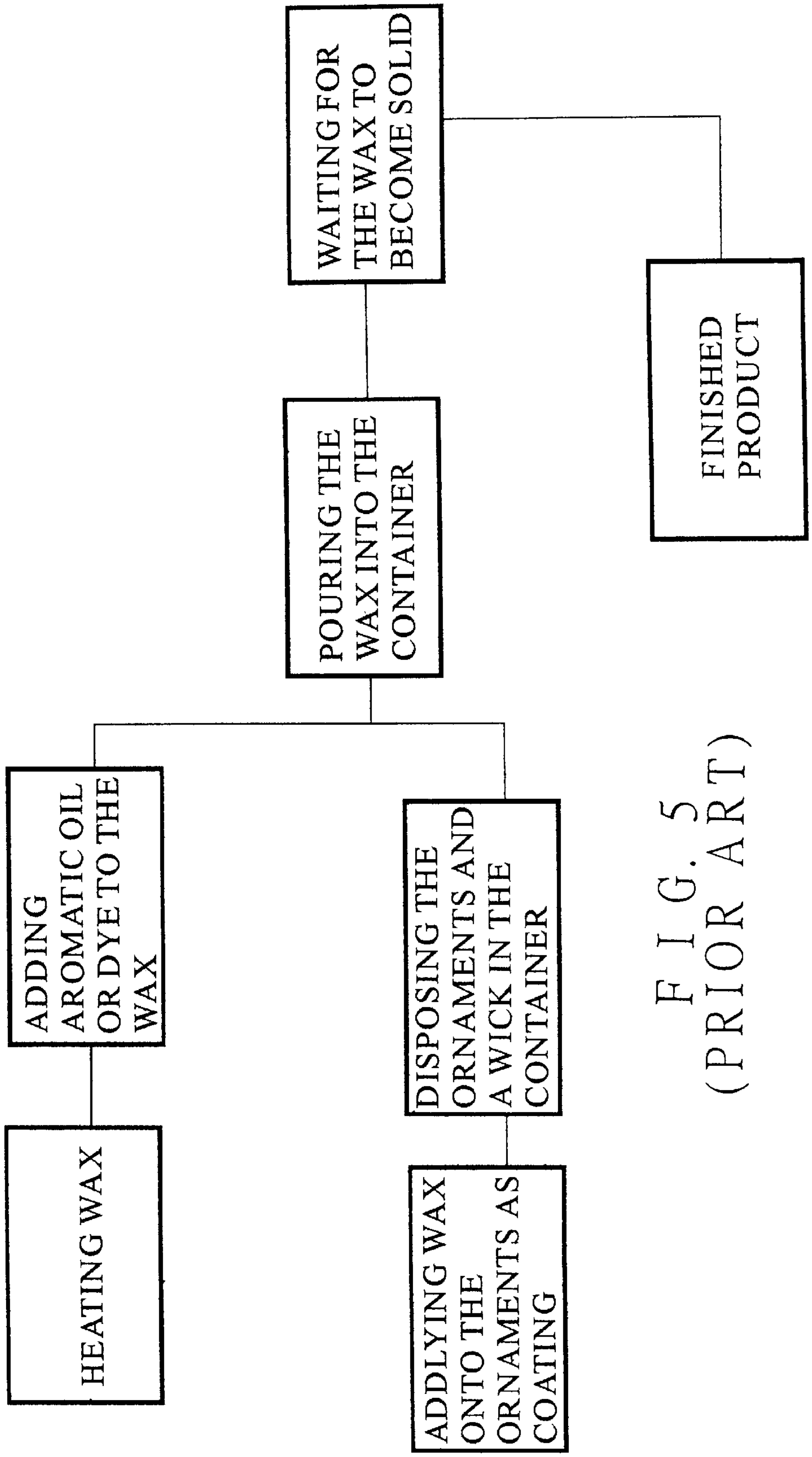
FIG. 5 (PRIOR ART)
FIG. 5 is a flow chart of a second conventional method for making a candle in the Background.
Figure 6:
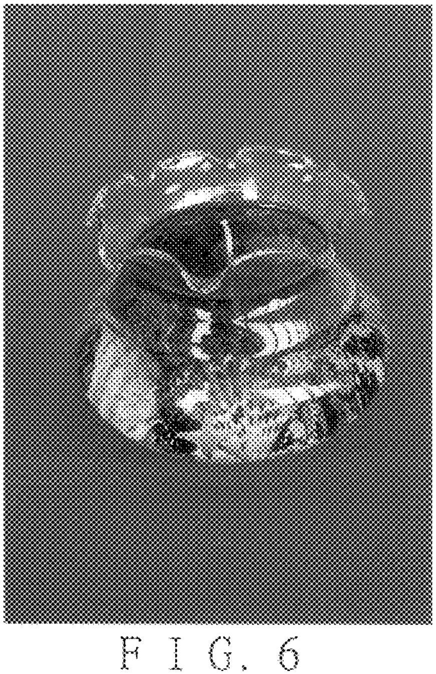
FIG. 6 is a photo of a candle made according to the present invention.
Figure 7:
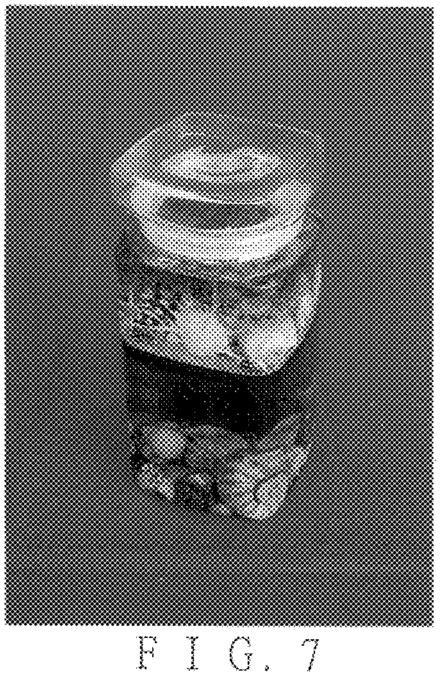
FIG. 7 is a photo of a candle made according to the present invention.
Figure 8:
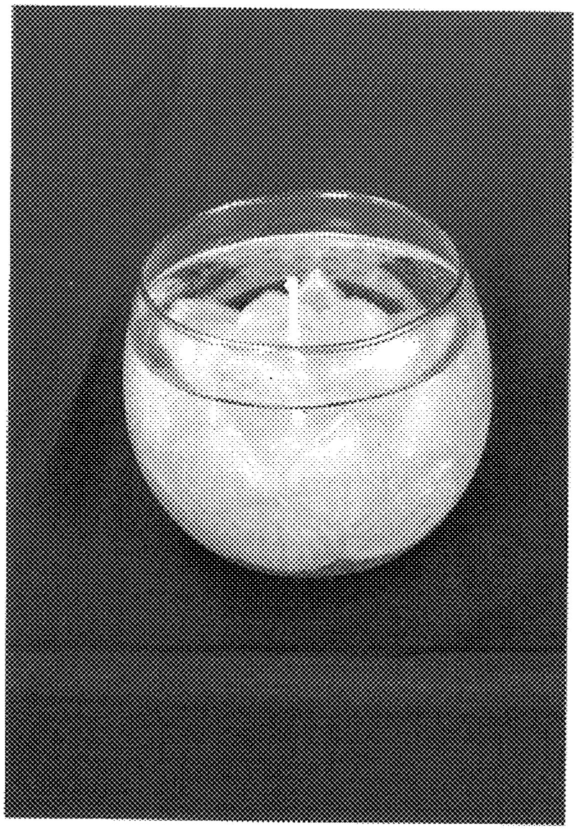
FIG. 8 is a photo of a candle made according to the present invention.
Figure 9:
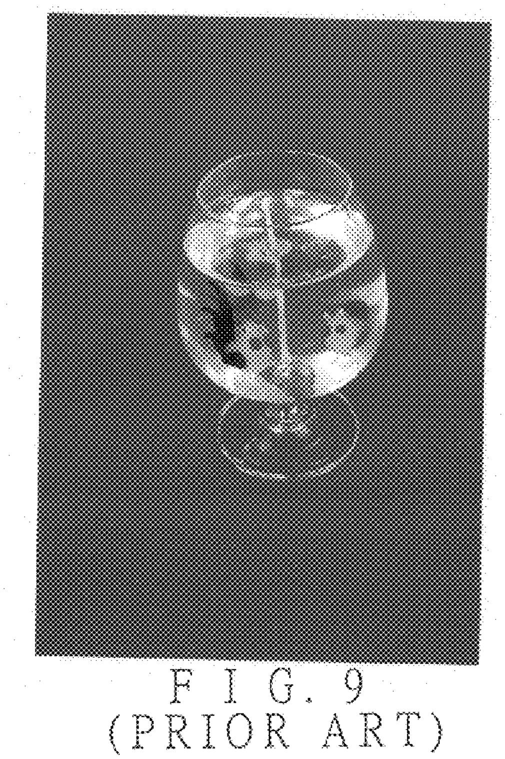
FIG. 9 (PRIOR ART)
FIG. 9 is a photo of a candle made according to the conventional method as described in the Background.
Figure 10:
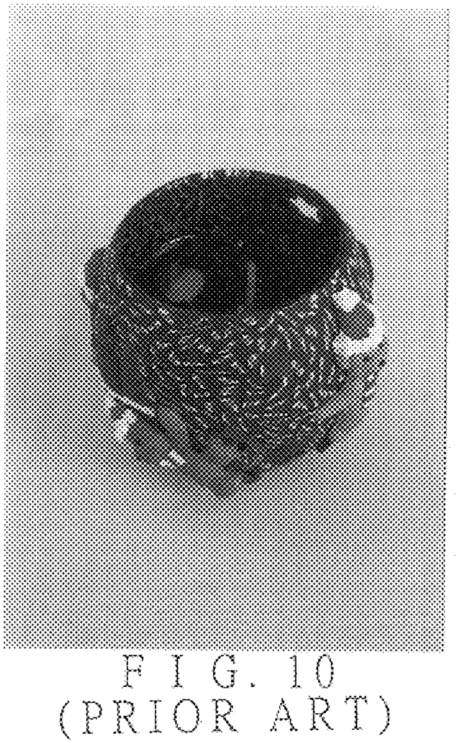
FIG. 10 (PRIOR ART)
FIG. 10 is photo of another candle made according to the conventional method as described in the Background.

Furthermore, before all the steps described above, water 8 can be added to the container 1, and additional ornaments 2 are put into the water in the container, and liquid jelly wax heated to between 180° C. and 235° C. is added onto the top side of the water to form a layer of separating wax 7. Then, steps as said in (1), (2), (3), (4) and (5) are done so that the candle has a lower water layer and an upper jelly wax layer, as shown in FIG. 3.

From the above description, the method for making jelly wax candle according to the present invention can be known to have an advantage that the candle made by the method looks more attractive and lively because of the air bubbles in the jelly wax, the layers of jelly wax with colors slightly changing from one to the next, and the large variety of ornaments, especially the ornaments made of marine plants and animals in the blue jelly wax like sea water. Therefore, the candles made by the method are more popular in the market.

What is claimed is:

1. A method for making a candle out of jelly wax, comprising the following steps:

(1) drying plurality of ornaments and a container;

(2) disposing a wick and said ornaments in said container;

(3) pouring liquid jelly wax heated to between 80° C. and 100° C. into said container for a first time of pouring; said liquid jelly wax being stirred when being heated; a period of one to two hours time being provided between said first pouring and a following step for permitting said liquid jelly wax poured into said container to change to a solid state;

(4) pouring liquid jelly wax heated to between 60° C. and 170° C. into said container for a second layer of jelly wax to form; a period of thirty to forty minutes time being provided between step (4) and a following step for permitting said second layer of jelly wax to change a semi-coagulated state; said liquid jelly wax being mixed with air for air bubbles to form in said second layer when same is being poured into said container;

(5) pouring liquid jelly wax heated to between 100° C. and 150° C. into said container for a third layer of jelly wax to form; said liquid jelly wax for said third layer being mixed with oily dyes; said third layer of jelly wax partially mixing with said second layer in said semi-coagulated state to form a plurality of layers of jelly wax with colors slightly changing from one to next.

2. The method for making a candle out of jelly wax as claimed in claim 1, wherein said ornaments includes sand, shells and starfish; said sand being disposed on a bottom of said container first with said wick being fixed thereby.

3. The method for making a candle out of jelly wax as claimed in claim 1, wherein said ornaments includes petals and plants; said petals and said plants being first provided with a coating of solid wax to become stiff; liquid jelly wax heated to between 70° C. and 100° C. being applied onto said petals and said plants before step (3) for preventing said heated liquid jelly wax poured into said container from damaging said petals and said plants.

4. The method for making a candle out of jelly wax as claimed in claim 1 further comprising a step before step (2); said further step including an action of pouring water into said container, and disposing additional ornaments in said water, and an action of forming a layer of separating wax by adding liquid jelly wax heated to between 180° C. and 235° C. on a top side of said water.

* * * * *